(12) United States Patent
Olmstead

(10) Patent No.: US 10,417,143 B2
(45) Date of Patent: Sep. 17, 2019

(54) APPARATUS AND METHOD FOR SENDING POWER OVER SYNCHRONOUS SERIAL COMMUNICATION WIRING

(71) Applicant: Esker Technologies, LLC, Mequon, WI (US)

(72) Inventor: Brian S. Olmstead, Bayside, WI (US)

(73) Assignee: Esker Technologies, LLC, Mequon, WI (US)

( * ) Notice: Subject to any disclaimer, the term of this patent is extended or adjusted under 35 U.S.C. 154(b) by 0 days.

(21) Appl. No.: 15/287,470

(22) Filed: Oct. 6, 2016

(65) Prior Publication Data

US 2017/0103027 A1    Apr. 13, 2017

Related U.S. Application Data

(60) Provisional application No. 62/238,963, filed on Oct. 8, 2015.

(51) Int. Cl.
*G06F 13/10* (2006.01)
*G06F 13/42* (2006.01)
*G06F 13/40* (2006.01)

(52) U.S. Cl.
CPC ........ *G06F 13/102* (2013.01); *G06F 13/4068* (2013.01); *G06F 13/4282* (2013.01)

(58) Field of Classification Search
CPC ...... G06F 13/385; G06F 13/387; G06F 1/266; H04L 12/10; H04L 25/0272; H04B 3/548
USPC .......................................................... 710/62
See application file for complete search history.

(56) References Cited

U.S. PATENT DOCUMENTS

| | | |
|---|---|---|
| 2,990,482 A | 6/1961 | Morris |
| 2,996,652 A | 8/1961 | Cassell |
| 3,139,585 A | 6/1964 | Ross |
| 3,678,341 A | 7/1972 | Constable |
| 4,523,307 A | 6/1985 | Brown et al. |
| 4,639,609 A | 1/1987 | Floyd et al. |
| 4,749,992 A | 6/1988 | Fitzemeyer et al. |
| 4,823,383 A | 4/1989 | Cardot et al. |
| 5,040,168 A | 8/1991 | Maue et al. |
| 5,142,278 A | 8/1992 | Moallemi |

(Continued)

FOREIGN PATENT DOCUMENTS

| | | |
|---|---|---|
| EP | 0659613 | 5/1995 |
| EP | 1383280 | 1/2004 |

(Continued)

OTHER PUBLICATIONS

Office Action dated Aug. 29, 2006 regarding U.S. Appl. No. 11/227,376, 10 pages.

(Continued)

*Primary Examiner* — Brian T Misiura
(74) *Attorney, Agent, or Firm* — Ryan Kromholz & Manion, S.C.

(57) ABSTRACT

Data and power are transmitted a master to a peripheral, with power communicated from a controller circuit board to the peripheral circuit board across data lines. Power is transmitted from the voltage regulator of the controller circuit board to an SPI or SSI master. Power over Synchronous Serial Interface (SSI) and Serial Peripheral Interface (SPI) uses Ethernet cable or custom 2 to 4-pair cable to move power high speed data between a microprocessor and a peripheral.

1 Claim, 2 Drawing Sheets

Simplex Data and Power from Master to Peripheral

(56) References Cited

U.S. PATENT DOCUMENTS

| | | |
|---|---|---|
| 5,148,144 A | 9/1992 | Sutterlin et al. |
| 5,353,189 A | 10/1994 | Tomlinson |
| 5,488,352 A | 1/1996 | Jasper |
| 5,694,109 A | 12/1997 | Nguyen |
| 5,727,025 A | 3/1998 | Maryanka |
| 5,739,592 A | 4/1998 | Rigsby et al. |
| 5,745,027 A | 4/1998 | Malville |
| 5,812,557 A | 9/1998 | Stewart et al. |
| 5,870,016 A | 2/1999 | Shrestha |
| 5,900,803 A | 5/1999 | Politz et al. |
| 6,006,143 A | 12/1999 | Bartel et al. |
| 6,127,939 A | 10/2000 | Lesesky et al. |
| 6,137,880 A | 10/2000 | Bella |
| 6,167,121 A | 12/2000 | Arai |
| 6,229,432 B1 | 5/2001 | Fridley et al. |
| 6,229,434 B1 | 5/2001 | Knapp et al. |
| 6,356,426 B1 | 3/2002 | Dougherty |
| 6,373,377 B1 | 4/2002 | Sacca et al. |
| 6,392,368 B1 | 5/2002 | Deller et al. |
| 6,393,064 B1 | 5/2002 | Nagai et al. |
| 6,400,103 B1 | 6/2002 | Adamson |
| 6,411,203 B1 | 6/2002 | Lesesky et al. |
| 6,418,221 B1 | 7/2002 | Snow et al. |
| 6,434,459 B2 | 8/2002 | Wong et al. |
| 6,453,687 B2 | 9/2002 | Sharood et al. |
| 6,507,158 B1 | 1/2003 | Wang |
| 6,512,307 B1 | 1/2003 | Ilg |
| 6,608,554 B2 | 8/2003 | Lesesky et al. |
| 6,629,032 B2 | 9/2003 | Akiyama |
| 6,731,201 B1 | 5/2004 | Bailey et al. |
| 6,744,352 B2 | 6/2004 | Lesesky et al. |
| 6,759,946 B2 | 7/2004 | Sahinoglu et al. |
| 6,771,774 B1 | 8/2004 | Phan et al. |
| 6,799,814 B2 | 10/2004 | Lesesky et al. |
| 6,800,957 B2 | 10/2004 | Nerone et al. |
| 6,842,108 B2 | 1/2005 | Akiyama et al. |
| 6,842,668 B2 | 1/2005 | Carson et al. |
| 6,853,724 B2 | 2/2005 | Wang |
| 6,895,089 B2 | 5/2005 | Wang |
| 6,933,752 B2 * | 8/2005 | Dreps ............ H03K 19/018514 327/65 |
| 6,970,772 B2 | 11/2005 | Radtke et al. |
| 7,010,050 B2 | 3/2006 | Maryanka |
| 7,042,339 B2 | 5/2006 | Bruccoleri et al. |
| 7,117,272 B2 * | 10/2006 | Rimboim ................ G06F 1/266 709/250 |
| 7,245,201 B1 | 7/2007 | Kline |
| 7,286,044 B2 | 10/2007 | Yanagida et al. |
| 7,307,520 B2 | 12/2007 | Lamon et al. |
| 7,545,178 B2 * | 6/2009 | Hung ................... H03K 5/2481 326/105 |
| 7,741,960 B1 | 6/2010 | Hoogenakker et al. |
| 7,752,472 B2 * | 7/2010 | Diab .................. G06F 13/4072 713/310 |
| 7,852,206 B2 | 12/2010 | Yanagida et al. |
| 7,859,397 B2 | 12/2010 | Lamon et al. |
| 7,921,308 B2 * | 4/2011 | Dhuyvetter ............ H04L 12/10 363/65 |
| 7,973,681 B2 * | 7/2011 | Garg ...................... H03M 5/04 341/68 |
| 8,154,150 B2 | 4/2012 | Sakai |
| 8,154,153 B2 | 4/2012 | Yang et al. |
| 8,179,655 B2 | 5/2012 | Wedley |
| 8,244,177 B2 * | 8/2012 | Zyambo ................. H02J 50/12 455/41.1 |
| 8,442,127 B2 | 5/2013 | Stadelmeier et al. |
| 8,527,135 B2 | 9/2013 | Lowrey et al. |
| 8,541,903 B2 | 9/2013 | Burk |
| 8,594,314 B2 | 11/2013 | Kitchin et al. |
| 8,638,216 B2 | 1/2014 | Lamon et al. |
| 8,693,151 B2 | 4/2014 | Iwasa et al. |
| 8,793,511 B1 * | 7/2014 | Bishara ................. G06F 1/266 713/300 |
| 9,451,655 B1 * | 9/2016 | Wong .................... H04W 88/08 |
| 9,515,747 B2 | 12/2016 | Soto et al. |
| 9,537,644 B2 * | 1/2017 | Jones ....................... H04L 5/14 |
| 9,779,720 B2 * | 10/2017 | Lee .................... G10K 11/1788 |
| 9,787,362 B2 | 10/2017 | Varadarajan |
| 2002/0079121 A1 | 6/2002 | Ryan |
| 2003/0076221 A1 | 4/2003 | Akiyama et al. |
| 2004/0258141 A1 | 12/2004 | Tustison |
| 2008/0013637 A1 | 1/2008 | Kodama |
| 2009/0134718 A1 | 5/2009 | Hurst |
| 2010/0061545 A1 | 3/2010 | Kitchin et al. |
| 2011/0279935 A1 | 11/2011 | Iwasa |
| 2012/0177133 A1 | 7/2012 | Oldenkamp |
| 2013/0223293 A1 * | 8/2013 | Jones ....................... H04L 5/14 370/276 |
| 2014/0265551 A1 | 9/2014 | Willis |
| 2015/0065039 A1 | 3/2015 | Nii |
| 2016/0351327 A1 | 12/2016 | Shigematsu |
| 2017/0040968 A1 | 2/2017 | Igarashi |
| 2017/0093230 A1 | 3/2017 | Yundt |
| 2017/0310306 A1 | 10/2017 | Tanghe |

FOREIGN PATENT DOCUMENTS

| | | |
|---|---|---|
| JP | 02005123960 | 5/2005 |
| WO | WO02/052745 | 7/2002 |
| WO | WO2004/055994 | 7/2004 |

OTHER PUBLICATIONS

Office Action dated May 8, 2007 regarding U.S. Appl. No. 11/227,376, 8 pages.

Office Action dated Feb. 18, 2010 regarding U.S. Appl. No. 12/001,123, 7 pages.

Joe Klinger, Phone Line Basics: Revisited, Mar. 2002, Radio Guide Magazine, accessed from www.jkaudio.com/article_10.htm on Oct. 10, 2017.

* cited by examiner

APPARATUS AND METHOD FOR SENDING POWER OVER SYNCHRONOUS SERIAL COMMUNICATION WIRING

RELATED APPLICATIONS

This application claims the benefit of U.S. Provisional Patent Application No. 62/238,963, filed Oct. 8, 2015.

BACKGROUND OF THE INVENTION

This invention relates generally to digital communication systems. In particular, this invention relates to transmission of both power and data over a common wire.

In many applications, space constraints encourage minimization and simplification of wiring. One such application (although this invention is not limited to such) is within a video game machine. In many video games, such as those gaming machines used in arcades and casinos, the video screen is carried by a hinged surface.

A door carrying a display is movable between open and closed positions, typically in hinged fashion. The door is opened quite frequently in cases of repairs, money retrieval from a cash box, or maintenance, in order to gain access to the working parts of the machine.

A gaming controller is located inside a interiorly of the display unit, the controller providing or generating game play information for display by the display. In some cases, the game can comprise a symbol displaying device and a game machine using the same in which rotational members having predetermined symbols (mark, numeral, letter, pattern and so forth) are rotated in different directions. In this game machine, existence and kind of winning are determined in accordance with a combination of the symbols which is displayed when the rotational members are stopped.

In this electrical engineering environment, several components of the game must act in concert. The manual input (e.g., pulling on a lever of a slot machine, pushing a button to make play) is a peripheral device. The input must be coupled with a controller, which must be coupled with a display. Other peripherals could include a receipt printer, a currency validator, gaming lights, security, and audio/visual components. All are typically powered, and the electrical controls are located inside the hinged portion of the gaming unit. A large amount of wiring exists inside of these machines, to communicate both data between the peripherals and control unit, and to communicate power to all of the components requiring power (most in modern video gaming).

Many forms of digital communications used today require a first set of wires to carry the digital messages (data) from one place to another; and another set of wires to carry power from a power source to the power usage station. External power supply is carried to "loads." An electrical load is an electrical component or portion of a circuit that consumes electric power. This is opposed to a power source, such as a battery or generator, which produces power. In electric power circuits examples of loads are appliances and lights. The term may also refer to the power consumed by a circuit.

When system uses dedicated wires for communications, those wires are often referred to collectively as the "communications bus." A communications bus refers to a group of wires whose responsibility it is to get information from the source to the intended receiver or from the receiver to the source. Those wires are acting as a stand-alone sub-system and must be isolated from other sub-systems. In more complex systems it is possible to have several communications buses. This would become necessary if the different communications sub-systems were incompatible and the digital information being conveyed by one sub-system would interfere with the operation of another sub-system.

Synchronous Serial interface (SSI) is a widely used serial interface standard for industrial applications between a controller and a sensor. Data is sent bit by bit over wires between the controller (master) and sensor (peripheral). The SSI bus normally consists of just two signals, data and clock, and communicates in one direction. This called half duplex or simplex communication.

Serial Peripheral Interface (SPI) is a synchronous serial communication interface specification used for short distance communication between a microcontroller and a peripheral. SPI uses separate lines for data and a clock to maintain registration between data sent and data received. The clock signals the receiver to sample bits on the data line. SPI devices use a master to control a peripheral. A SPI bus is defined as being full duplex, as it contains provisions for communicating in both directions. However, SPI communication is sometimes only implemented as half duplex. A SPI bus frequently uses four signals, data out, data in, clock, and a device select line.

In the prior art, an external power supply sends power to a controller circuit board over power lines. The external supply also sends power to the peripheral circuit board, again over power lines. A different set of lines—data lines, run between the controller circuit board and the peripheral circuit board to send commands from the controller circuit board to the peripheral circuit board, and to receive data back from the peripherals to the controller.

In another prior art system as specified by IEEE 802.3, Power over Ethernet (PoE) can be supplied. In a PoE system, power and data are communicated through Ethernet cabling. An example of PoE is single cable to provide both a data connection and electrical power to devices such as wireless access points.

SUMMARY OF THE INVENTION

Independent wiring supplying first, power; and second, data between a master to a peripheral, can be simplified by providing power over the same wires that supply data from the master to the peripheral.

Power and data can be provided over Synchronous Serial Interface (SSI) and Serial Peripheral Interface (SPI). Power over SSI and SPI involves using a short length of Ethernet cable or custom 2 to 4-pair cable to move high speed data between a microprocessor and a peripheral.

A microprocessor and a peripheral are located on separate circuit boards and the peripheral is powered from the microprocessor power supply over the SSI/SPI communication lines. An IEEE 802.3 compliant transformer is located at both ends of the communication lines. A center-tap on the media side of the transformer is used to inject power onto the bus wires on one side and extract it on the other. Continuing advancements in transformer development, for IEEE 802.3 such as PoE+ and PoE++ continue to the increase power delivery capabilities to 90 watts and beyond.

Many features of PoE exist to maintain backward compatibility with all previous Ethernet bus versions. Power over SSI/SPI may be implemented without regard to those limitations as long as a powered SSI/SPI cable is not plugged into a standard Ethernet jack.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
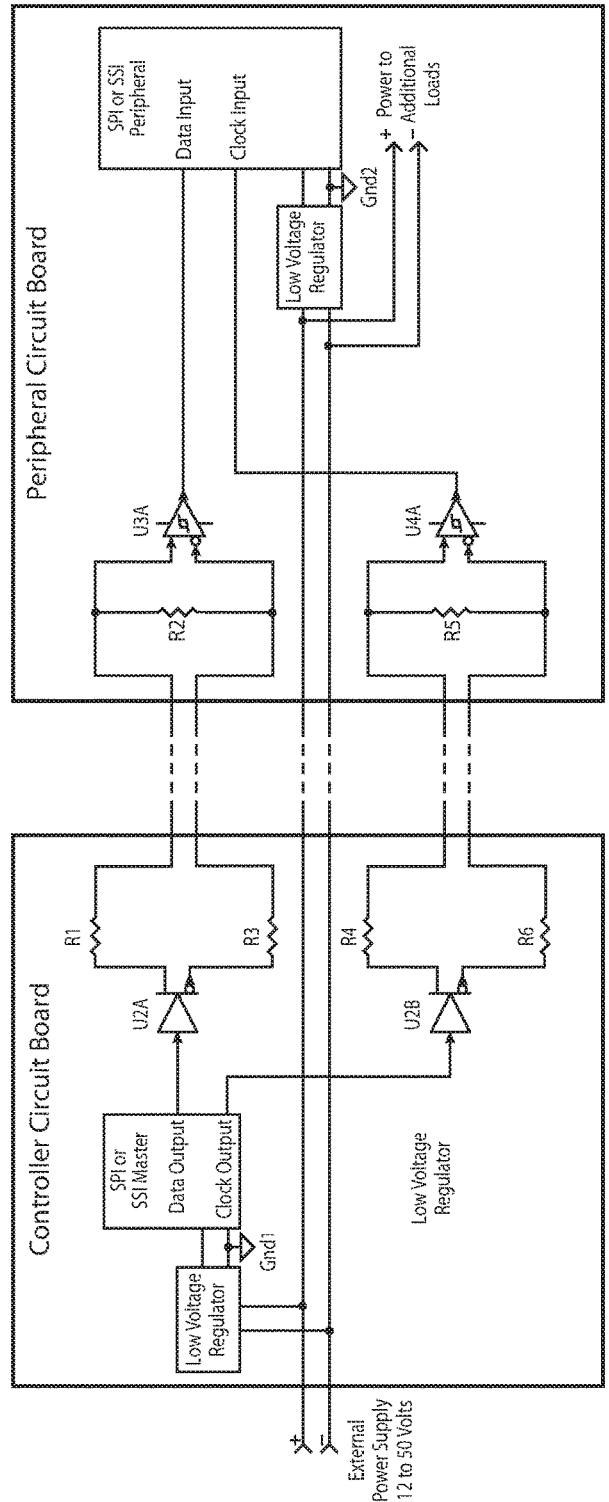
FIG. 1 is a schematic of a prior art simplex data transmission from a master to a peripheral, with external power lines extending to the peripheral circuit board in addition to data lines.

Referring now FIG. 1, a schematic of a prior art simplex data transmission from a master to a peripheral, with external power lines extending to the peripheral circuit board in addition to data lines is shown.

An external power supply is coupled to a voltage regulator of a controller circuit board, and also coupled to a voltage regulator of a peripheral circuit board.

Power is transmitted from the voltage regulator of the controller circuit board to an SPI or SSI master. Data is output from the SPI or SSI master to U2A, preferably a flow-through differential line driver designed for applications requiring ultra low power dissipation and high data transmission rates. From U2A, and after passing through resistors R1 and R3, data is passed from the controller circuit board through resistor R2 and to a dual differential line receiver U3A of the peripheral circuit board, which in turn provides data to the SPI or SSI peripheral. Clock input to the SPI or SSI peripheral is received in much the same way from the SPI or SSI master, with the output from the SPI or SSI master to driver U2B, through resistors R4 and R6 of the controller circuit board to resistor R5 of the peripheral circuit board, through receiver U4A of the peripheral circuit board, to clock input of the SPI or SSI peripheral. Power can be supplied from the peripheral circuit board to additional loads as desired.

Figure 2:
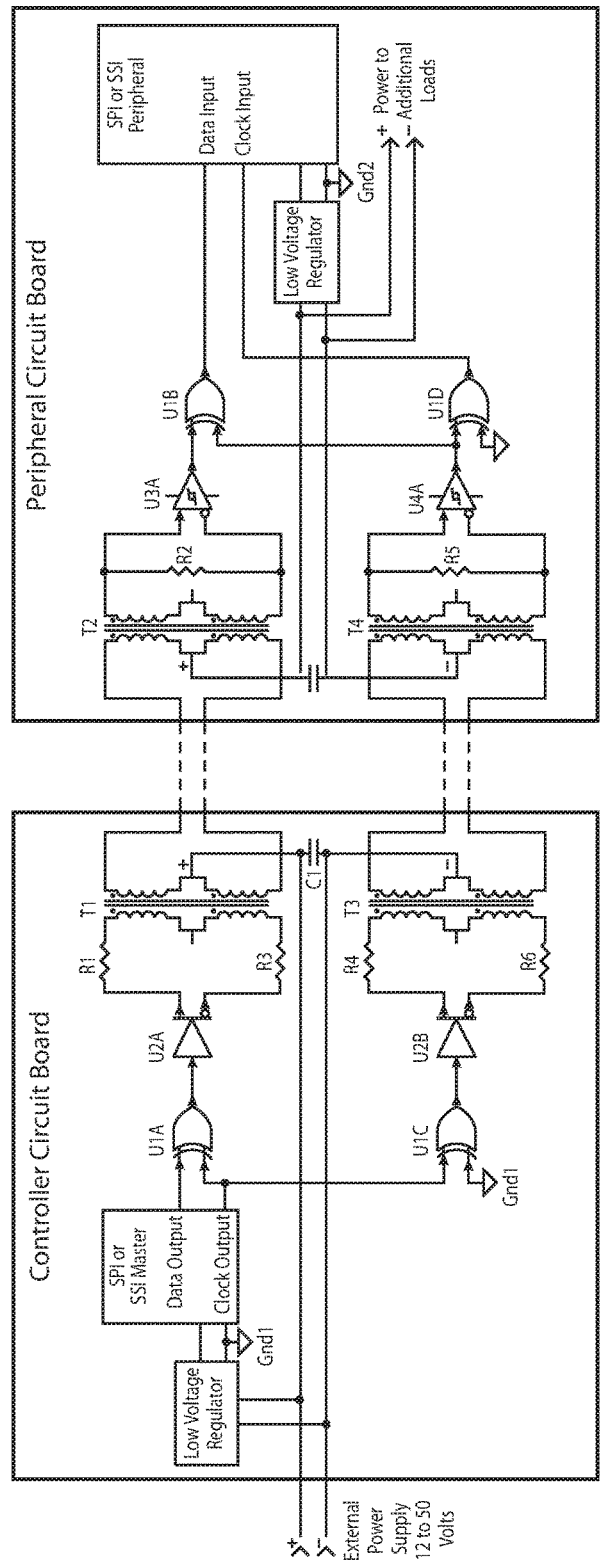
FIG. 2 is a schematic of a simplex data and transmission from a master to a peripheral, with power communicated from the controller circuit board to the peripheral circuit board across data lines.

Referring now to FIG. 2, a schematic of one embodiment of the present invention is shown. The present invention has preferred applicability under one or more of the following conditions:

An SPI peripheral is separate from the controller and sends or receives data in one direction.

four wires (two twisted pairs) are allowed between the controller and SPI peripheral.

A preferred wire gauge is large enough to carry the required current for the SPI peripheral.

If there are reasons to use the SPI format and not convert to another format.

One particular benefit to the preferred embodiment is being able to transmit or receive SPI data and power over two twisted pairs without two or more additional wires normally required for power.

In this embodiment, data and power transmission from a master to a peripheral, with power communicated from the controller circuit board to the peripheral circuit board across data lines is shown. Power is transmitted from the voltage regulator of the controller circuit board to an SPI or SSI master. Data is output from the SPI or SSI master to Quad 2-input (one input from data, one from clock) exclusive OR (XOR) gate U1A, then the data and clock information is passed to differential line driver U2A. From U2A, and after passing through resistors pa and R3, data is passed to PoE transformer T1, which also receives power from the external supply. T1 passes data and power from the controller circuit board to PoE transformer T2 of the peripheral circuit board, through resistor R2 and to receiver U3A of the peripheral circuit board, which in turn provides data to XOR gate U1B and then to the SPI or SSI peripheral. It is preferred to use twisted pairs between the controller circuit board and peripheral circuit board (at the dashed lines between the two as shown in FIG. 2). Still referring to FIG. 2, top pair, between T1 and T2, preferably carries a differential data signal and DC. The bottom pair, between T3 and T4, preferably carries a differential clock signal and is the return path for the DC.

Power is supplied from transformer T2 to the low voltage regulator of the peripheral circuit board, in turn passing power to the SPI or SSI peripheral. Clock input to the SPI or SSI peripheral is received in much the same way from the SPI or SSI master, with the output from the SPI or SSI master to XOR gate U1C, to driver U2B, through resistors R4 and R6, and PoE transformer T3 of the controller circuit board; to PoE transformer T4 resistor R5 of the peripheral circuit board, through receiver U4A to XOR gate U1D of the peripheral circuit board, to clock input of the SPI or SSI peripheral. Power is supplied to the transformers T1 and T3 through capacitor C1, to transformers T2 and T4, through another capacitor C1 to the voltage regulator of the peripheral circuit board (and passed to the SPI or SSI peripheral) and from the peripheral circuit board to additional loads as desired.

The present invention is described in terms of half duplex (simplex) communication, but full duplex communication can also be implemented, for instance by using a second SPI port on the master for receiving data. In this half duplex communication as described, a synchronous data output and a clock as well as power are sent to a peripheral.

Since SSI/SPI data will be coupled by PoE transformers to the wire pairs, it is preferably converted to a format which minimizes the DC component. The data preferably does not stay high or low, but preferably alternates. In other words, the data is preferably be converted from return to zero formatting (RZ), to non-return to zero (NRZ), preferably by XOR gates U1A, U1C and U1D. XOR gates are preferably digital logic gates that implement logical disjunction; HIGH output (1) results if one input to the gate is HIGH (1). If neither input is high, a LOW output (0) results. With the data and clock exclusive OR'ed together in this manner, the resulting signal will consist of a clock that changes phase by 180 degrees every time the data changes state. This NRZ signal is fed to a differential driver circuit to drive a PoE transformer winding. The clock is similarly connected to another transformer. Both transformers have a second winding that is center tapped. One center tap is connected to a voltage supply of 12 to 50 volts, and the other center tap is connected to ground to return the supplied current. The other winding connections send power, data, and clock signals over two twisted pair wires to the peripheral. A twisted pair of wires comprises, for instance, a type of wiring in which two conductors of a single circuit are twisted together for the purposes of canceling out electromagnetic interference (EMI) from external sources. Twisted pairs are preferred (but not necessary) in this embodiment.

The peripheral uses identical transformers to receive power using the center taps. The data and clock signals are received by differential line receivers. Unlike the usual NRZ to RZ scheme where clock reconstruction is attempted, this invention use the original clock signal to recover the original data. The data is recovered by using another exclusive OR function. Although this NRZ to RZ conversion scheme requires the clock signal to be sent with the data, it has two advantages. The first is simplicity of conversion. The second is cancellation of conversion glitches during the original RZ to NRZ conversion.

These glitches or temporary signal level changes are caused by the timing sequence of the clock and data outputs from their source. If the edges of the clock and data coincide exactly, then no glitches appear. However, if the data output lags the clock output by 10 nanoseconds for example, the exclusive OR output will have one transition when the clock changes, then a second transition will occur 10 nanoseconds later when the data changes. In some cases, these glitches may be filtered, but with fast data transfer, this may not be possible.

No filtering is required with this invention. Because the second exclusive OR gate at the peripheral uses the original clock, the glitch is taken into account and cancelled. It does not appear on the NZ data output. This is true as long as the data and clock are delayed equally by the transmission line and the rest of the system.

Still referring to FIG. 2, the PoE connection between PoE transformers T1 and T2, and the PoE connection between PoE transformers T3 and T4 can be carried together from the controller circuit board to the peripheral circuit board. In this manner, a controller (for instance a gaming light controller from a gaming machine) can be coupled with a single data and power connection to a peripheral circuit board (such as a peripheral of LEDs on a gaming machine). One advantage of this arrangement is that only a single power and data connection is required to physically span a hinge between the interior of the gaming machine (housing the controller circuit board), and the display on the door of a gaming machine, the display coupled with the peripheral circuit board.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A system for communicating data and power from a controller to a peripheral, the system comprising:
   a controller carrying at least one of a synchronous serial peripheral interface and serial synchronous interface master, said at least one of said serial peripheral interface and serial synchronous interface master transmitting data and clock signals to an XOR gate, said XOR gate coupled to a differential line driver, said differential line driver coupled to a PoE transformer, said PoE transformer coupled to a source of DC, a first twisted pair of wires coupling said controller and a peripheral circuit board, said first twisted pair of wires carrying DC between said controller and said peripheral circuit board;
   said XOR gate converting said data from return-to-zero formatting to non-return-to-zero formatting, said XOR gate removing a DC component from said data, said data communicated through said PoE transformer;
   a second twisted pair of wires coupling said controller and said peripheral circuit board, said second twisted pair of wires carrying said clock signal and DC between said controller and peripheral circuit board.

* * * * *